Figure 5:
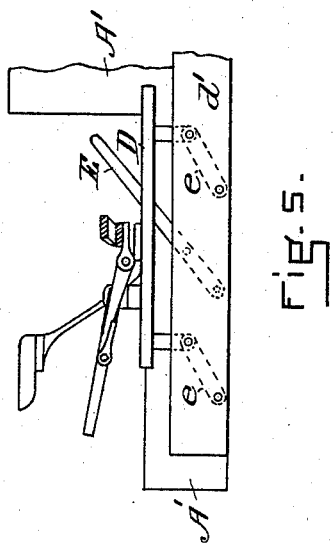

(No Model.) 2 Sheets—Sheet 1.
A. B. BLACK.
SNOW PLOW.
No. 591,091. Patented Oct. 5, 1897.
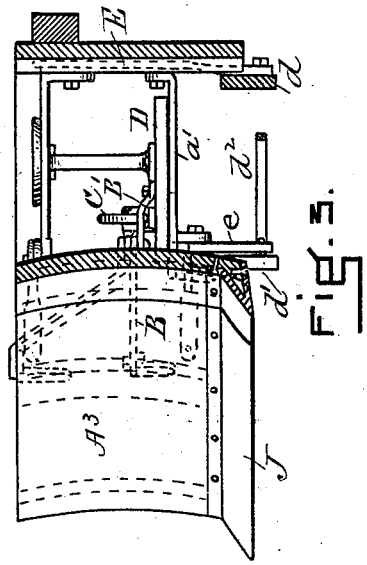
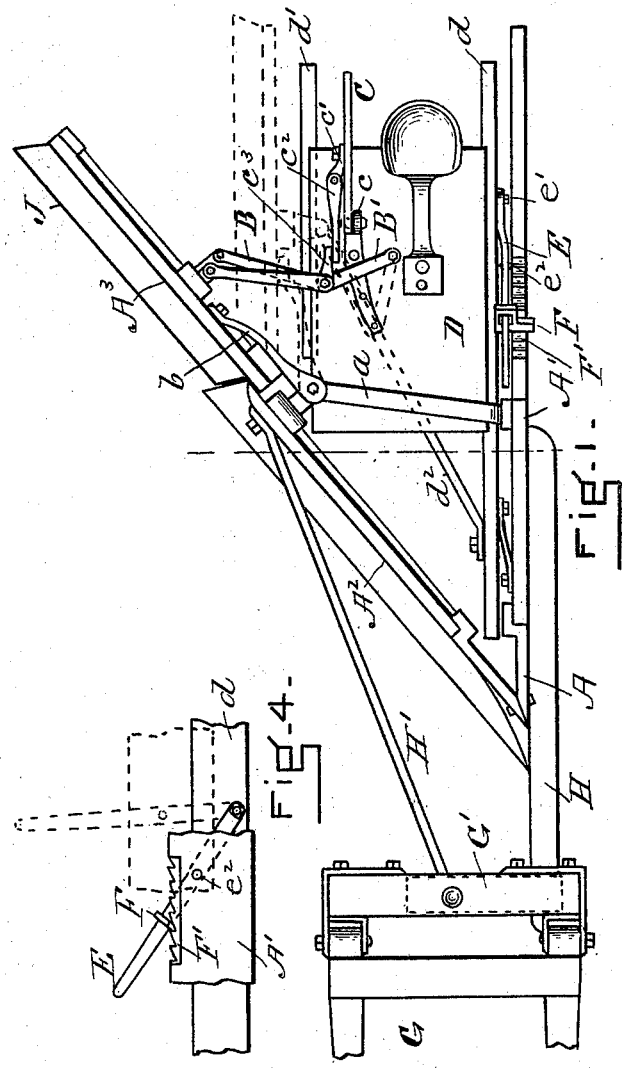
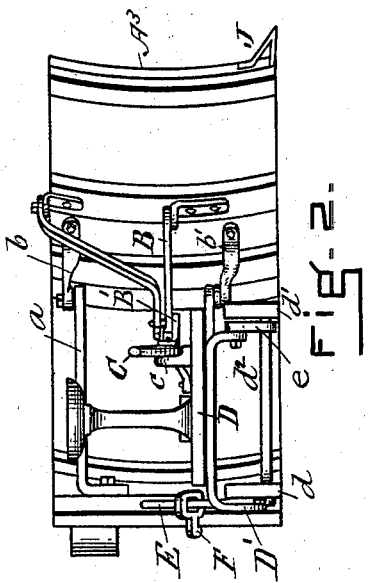
WITNESSES
INVENTOR
Albert B. Black (No Model.)

2 Sheets—Sheet 2.

A. B. BLACK.
SNOW PLOW.

No. 591,091.  Patented Oct. 5, 1897.

WITNESSES
Frank G. Parker
E. A. Guild

INVENTOR
Albert B. Black

UNITED STATES PATENT OFFICE.

ALBERT B. BLACK, OF LEXINGTON, MASSACHUSETTS.

SNOW-PLOW.

SPECIFICATION forming part of Letters Patent No. 591,091, dated October 5, 1897.

Application filed December 9, 1895. Serial No. 571,456. (No model.)

*To all whom it may concern:*

Be it known that I, ALBERT B. BLACK, of Lexington, in the county of Middlesex and State of Massachusetts, have invented a new and useful Improvement in Snow-Plows, of which the following is a specification.

My invention relates especially to that class of snow-plows which are provided with an "adjustable wing," so called—that is, a wing which is hinged at one side of the plow—but certain of the various improvements hereinafter described may be used with other forms of snow-plows.

My invention will be understood by reference to the drawings, in which my improvements are shown applied in the best form now known to me.

Figure 1 is a plan. Fig. 2 is a rear elevation. Fig. 3 is a section on line $xx$ of Fig. 1, looking rearward, the plow being raised from the ground. Fig. 4 is a detail. Fig. 5 is a side elevation of the rear portion of the plow, the oblique side being omitted, this view being intended to show more especially the method of connecting the links to both the plow and the runners, so that the plow may be lifted by the lever in the manner to be described below.

A is the point of the plow, from which extend rearward two sides A' and $A^2$. To the rear of the side $A^2$ is hinged the adjustable wing $A^3$. I prefer to hinge the adjustable wing to the plow in the following manner:

$a\ a'$ are two braces, which lie between the rear ends of the sides A' and $A^2$. To the upper side of the brace $a$ and the under side of the brace $a'$ are pivoted two arms $b\ b'$, which are attached to the adjustable wing, forming hinges. By this means the wing is prevented from having any vertical play, and the hinge-pivots being offset to such a distance the adjustable wing swings inward freely when it is necessary and at the same time the hinges are shielded from contact with the snow except under extraordinary circumstances.

D is the floor of the plow, on which may be mounted a seat for the driver. Its front end rests on the brace $a'$ and its rear end is supported by a cross-bar D', one end of which is attached to the straight side of the plow while the other is pivoted to the link $e$, as will be hereinafter described.

The adjustable wing is locked in its outward position in the following manner: B B' are toggle-arms, one being pivotally attached to the adjustable wing $A^3$ and the other, for convenience, to the floor D of a plow. It may, however, be connected to any other opposing part of the plow. C is a lever-handle which is fulcrumed in an ear $c$, also made fast to the floor D. This handle-lever is pivotally connected to the toggle by a system of links $c'$, $c^2$, and $c^3$.

It will be noticed that the link $c'$ is bolted to the handle-lever C and is connected by a vertical pivot to the link $c^2$. The link $c^2$ is connected to the link $c^3$ by a horizontal pivot and the link $c^3$ is connected to the hinge-pin of the toggle-joint. In this way I am enabled to give the toggle-arms a horizontal movement from a vertical movement of the handle-lever. This is a very important and desirable feature in a plow of this kind, as it locks the adjustable wing securely and yet enables the driver to control it without leaving his seat. Moreover it is a very useful mechanism in other locations.

In order to lift my plow from the ground, so that it may be easily transported, I mount it on runners—for example, a long runner $d$ and a short runner $d'$, connected by a suitable brace $d^2$ or working independent.

The floor D is mounted upon two cross-supports D', the ends of which are bent down, forming ears to which are pivoted the upper ends of a number of links $e$. On one side of the plow these links are pivotally connected to the runner $d'$ and at the other side of the plow to the long runner $d$. The lever E is also provided, which is pivoted to the runner $d$ at $e'$ and is pivoted to the plow at $e^2$. These runners are preferably connected by a cross bar or brace $d^2$ and normally run upon the ground, the brace $d^2$ serving to steady the runners sufficiently to allow the plow to be raised into the position shown in Fig. 3 by bringing the lever E into an upright position. This has proved a very simple manner of lifting the plow upon runners, so that it may be easily transported without any track.

It will be seen from Fig. 4 that by bringing the lever E into an upright position the plow will be raised into the position shown in Fig. 3, so that it may be easily transported upon the runner without undue drag. I provide the lever E with a sliding pawl F, which engages with the rack F', so as to lock the lever E in the desired position. In doing this in the manner shown the entire plow is lifted and given a rearward movement, so that it is supported bodily by the runners, the front end of the runners serving as stops to limit the rearward movement of the plow.

It will be understood that, the plow being, so far as its vertical movement is concerned, practically in one piece and connected by links in the manner described, any vertical movement given to any portion of the plow will be communicated by means of this link connection to every other portion of the plow.

While in a plow having one straight side it is desirable that the dragging power should be applied at the end of the straight side of the plow, the line of draft should be as near the center of resistance as possible. To accomplish this result as nearly as practicable, I pivot the shafts G to a draft-bar G', (shown in dotted lines in Fig. 1,) which projects from the beam H. This draft-bar is connected by a draft-rod H' to the middle of the angular side of the plow, as shown. Thus, although the shafts are located at the side of the plow, the line of draft is well toward the middle and a straight path is consequently assured.

The shafts G not only swing on the vertical pivot $g$, but also on hinged pivots $g'$. By this means they may be reversed in position, so as to lie over the top of the plow well out of the way while the plow is not in use.

In order to break out the under surface of the snow, I prefer to provide the bottom of the angular side with a shoe or shear J, which is angular and sharp, (see Figs. 2 and 3,) and, being made, preferably, of steel, extending way in front of the plow, serves both to break out the ice in front of the plow and also as a protection to that side of the plow to which it is attached. It is also attached, as will be seen, to the bottom of the angular side of the plow, so as to serve as a runner to support said angular side and serve as a protection thereto.

The point A of the plow I prefer to make in two pieces bolted together, as shown, as this affords a simple way of casting it and also a strong way of attaching the two parts together.

It will be seen that some of these various improvements may be used with other forms of plows than that shown above. They are all of them simple of construction, but when used together make a plow which is a great improvement on any now known to me.

When the plow is of very large size, it is desirable to use more than two runners, and in this case I prefer generally to use two lifting-levers. This is especially true when the plow is made double or V shape, in which case each part is best made with its own runners and lifting mechanism, &c., independent of the other, a suitable part corresponding to the straight side running back from the point and carrying a lifting-lever and such other parts as may be necessary.

It will be noticed that in the plow above described the draft is not upon the runners, but upon the plow itself, the runners serving no essential purpose while the plow is in use, but only as a frame upon which the plow may be lifted for transportation when out of use. In this respect its construction and operation differ from that of a plow in which the draft is brought at all times upon the runners, in which case if the plow is a left or right handed plow the tendency of the oblique side is to slue the runners off their proper course.

It is obvious that in such a plow as is last described, where the oblique side slues the runners, the greatest efficiency of the plow can never be had, whereas in my plow as the draft is brought equally upon the straight side and the middle of the oblique side the plow will always move in a line parallel with the straight side, and hence will always make a furrow of the greatest possible width.

What I claim as my invention is—

1. In a snow-plow having an adjustable wing, in combination with a pair of toggle-arms, one end connected to said adjustable wing and the other to an opposing stationary portion of the plow, a vertically-moving handle-lever and means whereby said handle-lever and said toggle are pivotally connected, said means consisting of connected links each having a horizontal and a vertical pivot and all connected together and to the toggles and levers in substantially the manner described.

2. In a snow-plow, two or more runners and a plow linked together as described, one link connection being near each end of each runner, the upper end of one link being extended to form a handle-lever whereby said plow may be lifted vertically and seated on the runners, substantially as set forth.

3. In combination, a snow-plow and two or more runners located within the angle of its sides and linked thereto and means whereby said plow is given an upward and rearward motion, the front of one of said runners being adapted to engage with the angular wall of said plow and form a stop to its rearward movement, as set forth.

4. In a snow-plow having a straight side, a draft-bar located at the front end of and at right angles to the straight side and connected thereto, and a draft-rod connected to said draft-bar at one end, its rear end being attached to the middle of the angular side of the plow whereby the plow is drawn by power directly applied to the plow itself and its course is maintained in line parallel with its straight side, all as and for the purposes set forth.

In witness whereof I have hereunto set my hand this 6th day of December, 1895.

ALBERT B. BLACK.

Witnesses:
GEORGE O. G. COALE,
EVA A. GUILD.